(12) United States Patent
Carleial et al.

(10) Patent No.: US 10,065,583 B2
(45) Date of Patent: Sep. 4, 2018

(54) INTEGRATED POWER DISTRIBUTION, DATA NETWORK, AND CONTROL ARCHITECTURES FOR A VEHICLE

(71) Applicant: Gulfstream Aerospace Corporation, Savannah, GA (US)

(72) Inventors: Pedro R. Carleial, Savannah, GA (US); Michael Knight, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 300 days.

(21) Appl. No.: 14/878,904

(22) Filed: Oct. 8, 2015

(65) Prior Publication Data
US 2017/0101067 A1    Apr. 13, 2017

(51) Int. Cl.
| | | |
|---|---|---|
| *B60L 1/00* | (2006.01) | |
| *B60L 3/00* | (2006.01) | |
| *H02G 3/00* | (2006.01) | |
| *B60R 16/03* | (2006.01) | |
| *B60R 16/023* | (2006.01) | |

(52) U.S. Cl.
CPC ............ *B60R 16/03* (2013.01); *B60R 16/023* (2013.01)

(58) Field of Classification Search
CPC .............................. B60R 16/03; B60R 16/023
USPC ......................................................... 307/9.1
See application file for complete search history.

(56) References Cited

U.S. PATENT DOCUMENTS

| | | |
|---|---|---|
| 8,447,434 B1 | 5/2013 | Harris et al. |
| 2005/0136989 A1 | 6/2005 | Dove |
| 2010/0198713 A1 | 8/2010 | Forbes, Jr. et al. |
| 2015/0103458 A1* | 4/2015 | Liffring .................. H01F 38/14 361/93.1 |

FOREIGN PATENT DOCUMENTS

WO    2009052447 A2    4/2009

OTHER PUBLICATIONS

European Patent Office, Extended European Search Report for Application No. 16192280.2-1804 dated Jan. 23, 2017.

* cited by examiner

*Primary Examiner* — Carlos Amaya
(74) *Attorney, Agent, or Firm* — LKGlobal | Lorenz & Kopf, LLP (57) ABSTRACT

An integrated power distribution, data network, and control architecture for a vehicle is provided that includes nodes distributed throughout the vehicle. Each node includes power distribution (PD) and data collection and distribution (DCD) components. The PD components receive electrical power from a source external to the node and distribute and control the electrical power supplied to active and passive electrical loads that are external to the node. The PD components include an electrical power input interface configured to receive an electrical power input from a source external to the node, and one or more power control modules. Each power control module can control the electrical power supplied to one or more electrical power output interfaces that supply power to the active and passive electrical loads. The DCD components receive data from data sources external to the node and transmit data to data consumers external to the node.

20 Claims, 4 Drawing Sheets

INTEGRATED POWER DISTRIBUTION, DATA NETWORK, AND CONTROL ARCHITECTURES FOR A VEHICLE

TECHNICAL FIELD

Embodiments of the present invention generally relate to integrated power distribution, data network, and control architectures for a vehicle, and more particularly to their use on an aircraft.

BACKGROUND OF THE INVENTION

Aircraft systems design has trended towards higher levels of integration. For example, many modern aircraft include digital data networks with distributed Remote Data Concentrators (RDCs) to receive and provide data near its source or end user, transmitting it over long distances across a digital network instead of multiple separate signal wires. This can reduce the amount of wiring needed onboard the aircraft. In another example of integration, many modern aircraft use integrated controllers to control multiple aircraft functions that were traditionally controlled by separate control units. This not only reduces aircraft cost and weight, but also reduces manufacturing and maintenance complexity.

In addition, modern aircraft typically include a power distribution system that includes primary power distribution units that supply continuous electrical power to several secondary power distribution units located throughout the aircraft. In one example of this approach, devices called modular power tiles (MPTs) receive one or more power inputs and perform the secondary power distribution to multiple end users using a plurality of solid state switches. MPTs are placed throughout the aircraft close to the end use electrical components in order to shorten the required wire lengths. MPTs are commanded by a built-in or external power system controller and associated software. This way, systems that were traditionally powered by individual wires from a primary power distribution bus bar, to a traditional circuit breaker, to a physical control switch, to each piece of equipment, can instead be powered by a nearby MPT which is itself powered by a feeder from the primary power distribution bus bar and controlled digitally. This eliminates traditional circuit breakers, many traditional switches, and large amounts of long distance small capacity wiring; reducing weight, and manufacturing and maintenance complexity. Fewer wires onboard the aircraft also reduce the potential for wire damage over the life of the aircraft and make it more weight and cost efficient to protect the remaining wire bundles.

Aircraft digital data networks, integrated system controllers, and power distribution systems continue to be developed in relative isolation by multiple subsystem suppliers.

It is desirable to further reduce the cost and weight of aircraft as well as the manufacturing and maintenance complexity. It is also desirable to provide greater longevity to aircraft systems by increasing the ability to modify system functions without changing the physical hardware of the system. Furthermore, other desirable features and characteristics of the present invention will become apparent from the subsequent detailed description and the appended claims, taken in conjunction with the accompanying drawings and the foregoing technical field and background.

SUMMARY

The disclosed embodiments relate to a vehicle, such as an aircraft, that includes an integrated power distribution, data network, and control architecture. The integrated power distribution, data network, and control architecture includes a plurality of active and passive electrical loads located throughout the vehicle, a plurality of data elements distributed throughout the vehicle, and a plurality of nodes. Each data element is either a data source, a data consumer, or both a data source and a data consumer. In one embodiment, each node includes power distribution (PD) and data collection and distribution (DCD) components. The PD components receive electrical power from at least one source external to the node and are configured to distribute and control the electrical power to a plurality of active and passive electrical loads that are external to the node. In one embodiment, the PD components include an electrical power input interface configured to receive an electrical power input from a source external to the node, and one or more power control modules. Each power control module can control the electrical power supplied to one or more electrical power output interfaces that supply power to the active and passive electrical loads. The DCD components receive data from data sources external to the node and transmit data to data consumers external to the node.

In one embodiment, each node can include a processor module, and a computer-readable medium having computer-executable instructions stored thereon that, when executed by the processor module, cause the processor module to process data received by the DCD components, process data to be transmitted by the DCD components, and receive data from data sources external to the node via the DCD components. The computer-executable instructions, when executed by the processor module, can also cause the processor module to command the one or more power control modules that supply electrical power to the active and passive electrical loads external to the node. In one implementation, the computer-executable instructions, when executed by the processor module, can cause the processor module to transmit commands to one or more power control modules that supply the electrical power to the active and passive electrical loads such that power is supplied to or removed from the active and passive electrical loads in a way that is responsive to the data received via the DCD components as defined by the stored computer-executable instructions.

In one embodiment, the integrated power distribution, data network, and control architecture can receive commands from control devices operated by the vehicle operator via the DCD components of the nodes, and receive data about the state of the vehicle from data sources via the DCD components of the nodes. Power supplied to the active and passive electrical loads is controlled in response to the operator commands and the state of the vehicle, as defined by the computer-executable instructions stored in the nodes. In another embodiment, operation of the plurality of active and passive electrical loads, in response to operator commands and the state of the vehicle as defined by the computer-executable instructions stored in the nodes, result in one or more functions being performed.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description Overview In modern aircraft, the data networks and the electric power distribution system are separate. Each system connected to the data networks and to the electric power distribution system typically includes its own controllers, application specific hardware, and software. Integrating power distribution, data networks and controller functions allows the reduction of the number of separate electronic units that need to be installed on an aircraft and the amount of wiring required to interconnect them. This allows a reduction in aircraft weight and cost, and a reduction of the internal volume occupied by equipment.

The disclosed embodiments relate to integrated power distribution, data network, and control architectures. The integrated power distribution, data network, and control architectures can be installed in vehicles. In one exemplary implementation, that will be described below with reference to FIGS. 1-4, the vehicle is an aircraft; however, it will be appreciated that the disclosed embodiments can be implemented within any other type of vehicle including land (e.g., automobiles), water (e.g., boats, ships, submarines), air (e.g., helicopters, drones, etc.) or space vehicles. In addition, in some implementations, the disclosed embodiments can be implemented in other installations such as ground facilities (e.g., industrial facilities, power plants, etc.).

Nodes are arranged throughout the vehicle. Each node is an integrated unit that includes secondary power distribution (SPD) components and data collection and distribution (DCD) components. These components may be installed within a housing, such as modular housing. The SPD components can receive electrical power from at least one source external to the node and can distribute the electrical power to active and passive electrical loads that are external to the node. As used herein, the term "active electrical load" refers to an electrical load that has the ability to change the physical state of the vehicle. Some non-limiting examples of active electrical loads can include, but are not limited to, motors, heaters, valves, etc. As used herein, the term "passive electrical load" refers to an electrical load that does not have the capability of changing the physical state of the vehicle. Some non-limiting examples of passive electrical loads can include, but are not limited to, sensors, displays, lights such as indicator lights, etc. The DCD components can receive data from data elements (that are data sources) external to the node and can communicate data to data elements (that are data consumers) external to the node.

In accordance with the disclosed embodiments, an integrated power distribution, data network, and control architecture for a vehicle, such as an aircraft, is provided. The vehicle may include electrical loads and data elements distributed throughout the vehicle. Each data element is either a data source, a data consumer, or both a data source and a data consumer. The vehicle also includes at least one electrical power source. In accordance with the disclosed embodiments, the integrated power distribution, data network, and control architecture can include one or more nodes distributed throughout the vehicle, primary and secondary power distribution lines, and one or more digital data buses. Each primary power distribution line couples a particular node to at least one electrical power source that is external to the node. Each secondary power distribution line connects a particular node to at least one electrical load. Each digital data bus connects a particular node to one or more other nodes, to one or more data elements, or to a combination of other nodes and data elements.

Figure 1:
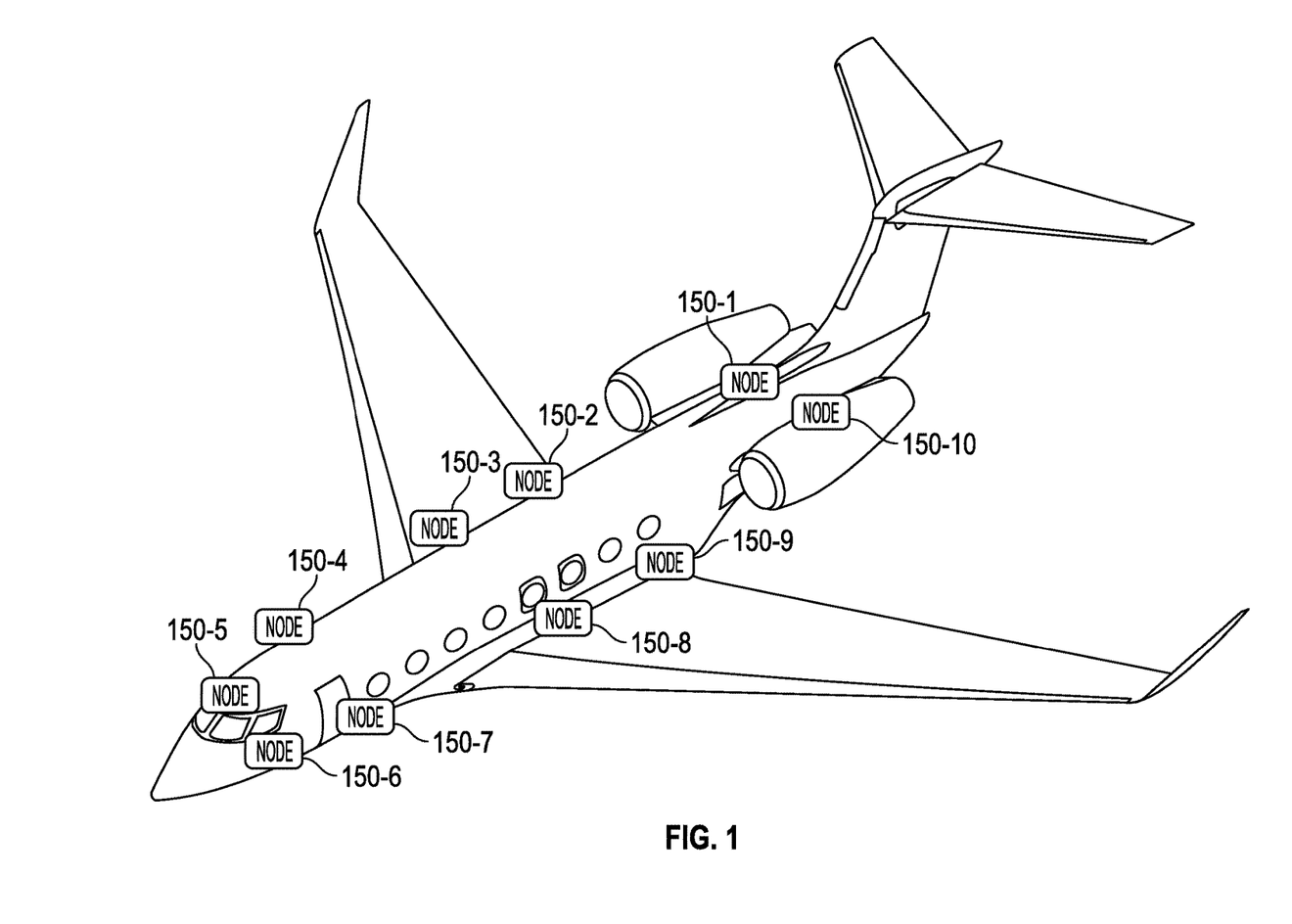
FIG. 1 is a perspective view of an aircraft that includes nodes in accordance with one non-limiting implementation of the disclosed embodiments.

FIG. 1 is a view of an aircraft 100 in which the disclosed embodiments can be implemented in accordance with one exemplary, non-limiting implementation. FIG. 1 illustrates that various nodes 150 can be located onboard the aircraft 100. FIG. 1 is intended to illustrate a conceptual representation of the nodes, but it should be appreciated that the nodes 150 can be located anywhere onboard the aircraft. Moreover, the number and relative locations of the nodes 150 are non-limiting. In other words, any number of nodes 150 can be included within the aircraft 100 and the nodes can be mounted anywhere throughout the aircraft 100. As will be described below with reference to FIGS. 2-4, the nodes 150 are part of a scalable integrated power distribution, data network, and control architecture that can be used to implement a distributed aircraft systems platform within the aircraft 100. Although not shown in FIG. 1, the aircraft 100 may also include various other onboard computers, aircraft instrumentation, and additional control systems that are not illustrated for sake of clarity. Other features of nodes and the aircraft 100 will now be described below with reference to FIGS. 2 through 4. As a preliminary matter, it is noted that in FIGS. 1, 3 and 4, some of the various primary power sources 140, primary power distribution units 142, sections of the power distribution lines 145, nodes 150, electrical loads 160, data elements 170, sections of data bus 180, and switches 190 are illustrated as being external to the aircraft. However, it will be appreciated by those skilled in the art that this depiction is for illustration purposes only and that the various primary power sources 140, primary power distribution units 142, sections of the power distribution lines 145, nodes 150, electrical loads 160, data elements 170, sections of data bus 180, and switches 190 are actually integrated throughout and within the aircraft.

Figure 2:
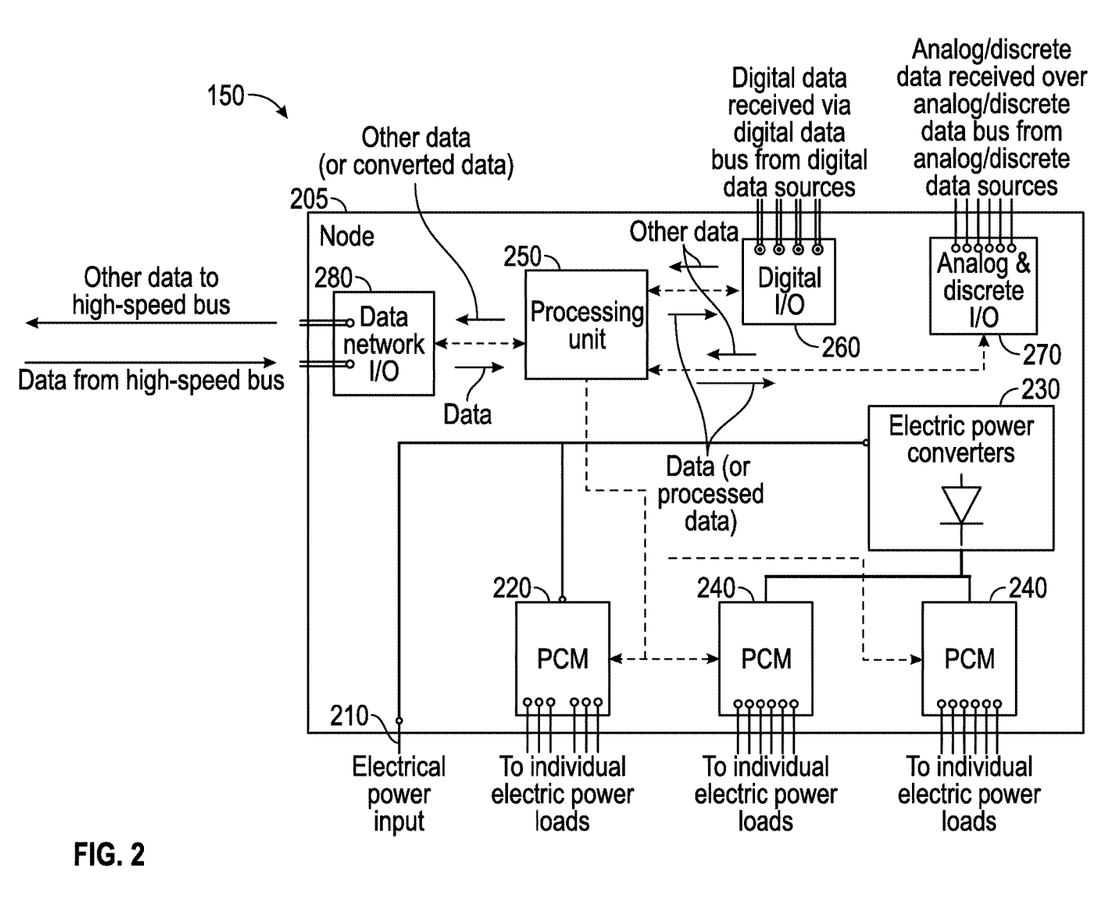
FIG. 2 is a block diagram that illustrates a node in accordance with one non-limiting implementation of the disclosed embodiments.

FIG. 2 is a block diagram that illustrates an exemplary node 150 in accordance with the disclosed embodiments.

The node 150 is an integrated, multi-function component or unit. In the exemplary embodiment, the node 150 includes a housing 205 that contains secondary power distribution (SPD) components including an electrical power input interface 210, a high-voltage power control module 220, one or more electrical power converter module(s) 230, low-voltage power control modules 240; a processor module 250 that performs a variety of processing and control functions; and data collection and distribution (DCD) components including a digital I/O interface module 260, an analog and discrete I/O interface module 270, and a high-bandwidth digital network I/O interface module 280. In one embodiment, each of the modules can be separate pieces of equipment that are interconnected to each other without the use of wires external to the housing 205. In another embodiment, each of the modules can be one or more electronic components installed on one or more circuit boards. As used herein, a housing of a node can be a single container that encloses or encompasses all the components of a node, or modular containers that are mounted and interconnected to each other. To distinguish between the two implementations, the former will be referred to as a housing, and the latter will be referred to as a modular housing. Each of the various DCD interface modules 260, 270, 280 may include various hardware and software components that are not illustrated for sake of clarity.

The electrical power input interface 210 is configured to be coupled to an electrical power source. The electrical power input interface 210 supplies electrical power that is distributed by the node 150 to electrical loads that consume electrical power and are located external to the node 150 and onboard the aircraft. In this embodiment, the electrical power input interface 210 supplies high-voltage DC electrical power to the high-voltage power control module 220 and the electrical power converter module(s) 230. Although in this embodiment the electrical power input interface 210 is a single electrical power input interface that receives a high-voltage DC input, it should be appreciated that the electrical power input interface 210 can be of a different type (e.g., three phase AC), or include multiple redundant electrical power inputs from different sources.

The node 150 serves as a secondary power distribution (SPD) unit that distributes electrical power to one or more electrical loads located external to the node and onboard the vehicle. As will be described in greater detail below, the node 150 can be connected to one or more electric power sources via one or more electrical power input interfaces and supply electrical power to external loads that consume electrical power (e.g., actuators, motors, etc.) via one or more power output interfaces.

The processor module 250 can represent at least one computer processor and associated computer memory that is either internal or external to the computer processor. The processor module 250 performs the computation and control functions of the node. As used herein, a "computer processor" can refer to any type of conventional processor, controller, microcontroller, digital signal processor (DSP) or state machine. A processor module can be implemented using a single computer processor or multiple computer processors that are not part of a single unit. Further, a processor module may comprise single integrated circuits such as a microprocessor, or any suitable number of multiple computer processors or integrated circuit devices and/or circuit boards working in cooperation to accomplish the functions of a processor module. Thus, a processor module is not necessarily implemented as a single discrete unit in all embodiments, but may also be implemented using a plurality of said computer processors that are distributed throughout the node. It should be understood that the computer memory may be a single type of memory component, or it may be composed of many different types of memory components. The memory may include non-volatile memory (such as ROM, flash memory, etc.), volatile memory (such as RAM), or some combination of the two. The RAM may be any type of suitable random access memory including the various types of dynamic random access memory (DRAM) such as SDRAM, the various types of static RAM (SRAM). The computer memory may contain an operating system, and executable code for power control programs, data conversion programs, or system control programs that can be loaded and executed at the processor module 250.

In this embodiment, the processor module 250 is configured to provide control signals to the high-voltage power control module 220 and the low-voltage power control modules 240, controlling the electrical power outputs of each. The processor module 250 generates the control signals (or "commands") that are communicated to high-voltage power control module 220 and the low-voltage power control modules 240 to control distribution of electrical power to various equipment or "loads" that are located throughout the aircraft 100 (as will be described in greater detail below with reference to FIG. 4). In another embodiment, the DCD interfaces receive control signals that are generated by vehicle systems and subsystems that are external to the node (e.g.: Flight Control Computers, Flight Management Systems, control input devices activated by the driver or pilot), and one or more of the power control modules 220 and 240 supplies electrical power to electrical loads responsive to those external control signals.

The high-voltage power control module 220 includes a number of electrical power outputs to individual electric power loads. In one embodiment, the high-voltage power control module 220 can be implemented using a Solid State Power Controller (SSPC). The high-voltage power control module 220 includes electric power control elements capable of switching each electric power output from the high-voltage power control module 220 on or off in response to control signals received from the processor module 250. The control signals are illustrated via dashed lines in FIG. 2. In response to commands from the processor module 250, the high-voltage power control module 220 controls distribution of the high-voltage DC electrical power to external electrical loads that use or require high-voltage electrical power. Although FIG. 2 shows six outputs, it should be appreciated that the high-voltage power control module 220 can include any number of electrical power outputs needed based on the particular implementation of the node.

As previously noted, in this embodiment the electrical power input interface 210 also supplies high-voltage DC electrical power to the electrical power converter modules 230. The electrical power converter module 230 can include one or more electrical power converters need to convert input received via the electrical power input interface 210 to the type of electrical power used by the electrical loads external to the node. As used herein, an electrical power converter refers to hardware that is designed to receive an electrical power input via an electrical power interface and to convert the electrical power input to generate an electrical power output that is provided to one or more power control modules. The electrical power input can be any type of power input that is adequate for distribution, and that can be converted by the electrical power converter to any other type of electrical power that is used by external electrical loads. In one embodiment, the electrical power converter can change a characteristic of the electrical power input to generate an electrical power output having different characteristics. For example, the electrical power converter can change the waveform of the electrical power input to generate an electrical power output having different waveform. As an example, in one embodiment, the electrical power converter can convert a DC electrical power input to an AC electrical power output, or vice-versa. In another embodiment, the electrical power converter can convert the frequency of an AC electrical power input to an AC electrical power output having a different frequency. The electrical power converter can also change the voltage of the electrical power input to generate an electrical power output having different (higher or lower) voltage level.

For example, in one embodiment, the electrical power converter module 230 can include elements such as transformers, rectifiers, and filters for converting a high-voltage DC input (received from the electrical power input interface 210) to a lower electrical power. In the embodiment illustrated in FIG. 1, the electrical power converter module 230 can include a step-down transformer to convert a high-voltage DC input (received from the electrical power input interface 210) to a low-voltage DC output. In other words, the electrical power converter module 230 can convert the high-voltage DC electrical power to a lower voltage DC electrical power (e.g., 28 volt DC), and provides the lower voltage DC electrical power to each low-voltage power control module 240. In response to commands from the processor module 250, the low-voltage power control modules 240 control distribution of the lower voltage DC electrical power to external electrical loads that use or require low voltage electrical power.

Each low-voltage power control module 240 provides electric power control elements capable of switching electric power that is output from that low-voltage power control module 240 on or off in response to control signals (illustrated via dashed lines in FIG. 2) received from the processor module 250. In one embodiment, each low-voltage power control module 240 can be implemented using a Solid State Power Controller (SSPC). Each low-voltage power control module 240 may include a number of electrical power outputs to individual electric power loads. Although each low-voltage power control module 240 of FIG. 2 shows six outputs, it should be appreciated that each low-voltage power control module 240 can include one or more electrical power outputs needed based on the particular implementation of the node 150.

In addition, although not specifically illustrated in FIG. 2, in some embodiments, the electrical power converter module 230 can include additional electrical power converter(s), such as an inverter, for converting the high-voltage DC input from the electrical power input interface 210 to an AC voltage (not illustrated) that can then be supplied to an AC power control module (not shown). This way the node 150 can distribute both AC power and DC power to external loads. Conversely, in embodiments powered by AC power at the electrical power input interface 210, the electrical power converter(s) 230 can include transformer rectifiers to provide high or low voltage DC output to the high-voltage power control module 220 and low-voltage power control modules 240.

The node 150 also serves as a data collection and distribution unit. The processor module 250 at each node can aggregate data received through the digital, analog and discrete I/O interface modules 260, 270, optionally process that data and then transmit the aggregated data through the high-bandwidth digital network interface module 280. The node 150 can be coupled to various data sources (e.g., sensors, control input devices and other types of equipment) using the digital I/O interface module 260 and the analog and discrete I/O interface module 270. The node 150 can then distribute data that is receives through these interface modules 260, 270 via a high-bandwidth digital network I/O interface module 280, or through the digital I/O interface module 260 and the analog and discrete I/O interface module 270 themselves. In addition, each processor module 250 can also receive data through the high-bandwidth digital network interface module 280, optionally process that data and then communicate that data through the appropriate digital, analog and discrete I/O interface modules 260, 270 for communication over an appropriate bus to intended data consumers (i.e., data elements that are data consumers).

The digital I/O interface module 260 receives, from data sources or aircraft equipment, digital data that is compliant with digital bus standards, such as A429, CAN bus, MIL-STD-1553. The digital I/O interface module 260 can receive digital input signals communicated over a digital bus from data sources, and can communicate digital output signals over a digital bus to data consumers. Although the digital I/O interface module 260 is illustrated as a single block, it should be appreciated that the block labeled digital I/O interface module 260 can include one or more different types of digital I/O interfaces and associated hardware.

The analog and discrete I/O interface module 270 receives discrete and/or analog data from data sources or aircraft equipment. Examples of such aircraft equipment include pressure sensors, temperature sensors, flow meters, proximity sensors or switches, etc. The analog and discrete I/O interface module 270 may be designed to receive one or more analog input signals and any type of discrete input data. The analog and discrete I/O interface module 270 can receive analog input signals communicated, for example, from a thermocouple. The analog and discrete I/O interface module 270 can receive discrete input data communicated, for example, from a position switch. The analog and discrete I/O interface module 270 can also communicate analog output signals to various types of electrically controlled actuators, and can also communicate discrete output data to solenoids, indicator lights and other low power electrical devices. Although the analog and discrete I/O interface module 270 is illustrated as a single block, it should be appreciated that block analog and discrete I/O interface module 270 can include one or more different types of analog and discrete I/O interfaces and associated hardware. In one embodiment, the analog and discrete I/O interface module 270 can also include associated analog-to-digital converters (ADCs) that convert analog input signals and discrete data into a digital format, and then communicate digital signals to the processor module 250 so that the processor does not have to perform this conversion. Likewise, in some embodiments, the analog and discrete I/O interface module 270 can also include digital-to-analog converters (DACs) and output drivers need to convert data from the processor module 250 to generate any number of analog output signals.

The data transmitted by the node 150 through the high-bandwidth digital network I/O interface module 280, may be routed to other nodes 150 directly, or using network switches (as will be described in greater detail below with reference to FIG. 4).

The data conversion performed by the node 150 may be defined by configuration files that define the data source of particular data, a data consumer for that particular data, and instructions for how that particular data needs to be processed and re-formatted prior to sending it through the appropriate interface module toward the intended data consumer.

The high-bandwidth digital network I/O interface module 280 allows the node 150 to be connected directly or via network switches to other nodes 150, Integrated Modular Avionics (IMA) units, or other electronic equipment onboard the aircraft. In FIG. 2, the high-bandwidth digital network I/O interface module 280 is illustrated as a single block. However, the high-bandwidth digital network I/O interface module 280 can represent more than one high speed network interface and associated hardware. Additionally, in FIG. 2, the high-bandwidth digital network I/O interface module 280 is illustrated connected to dedicated output wires. However, in another embodiment the high-bandwidth digital network I/O interface module could transmit and receive information using the same wire or wires connected to the power input interface 210 ("data over power"). As such, the high-bandwidth digital network I/O interface module 280 includes at least one high-bandwidth network interface that is designed to communicate data over a bus (not illustrated in FIG. 2). Depending on the implementation, the high-bandwidth digital network I/O interface module 280 can be designed for communication in accordance with one or more high-bandwidth bus protocols such as Ethernet, A664, AFDX, etc. The high-bandwidth digital network I/O interface module 280 communicates the concentrated data over a bus (not shown in FIG. 2) to network switches, other nodes 150 (not shown in FIG. 2), or other electronic equipment external to the node 150 (not shown in FIG. 2). The high-bandwidth digital network I/O interface module 280 can also receive data that is communicated from network switches, other nodes 150, or other electronic equipment external to the node 150.

Figure 3:
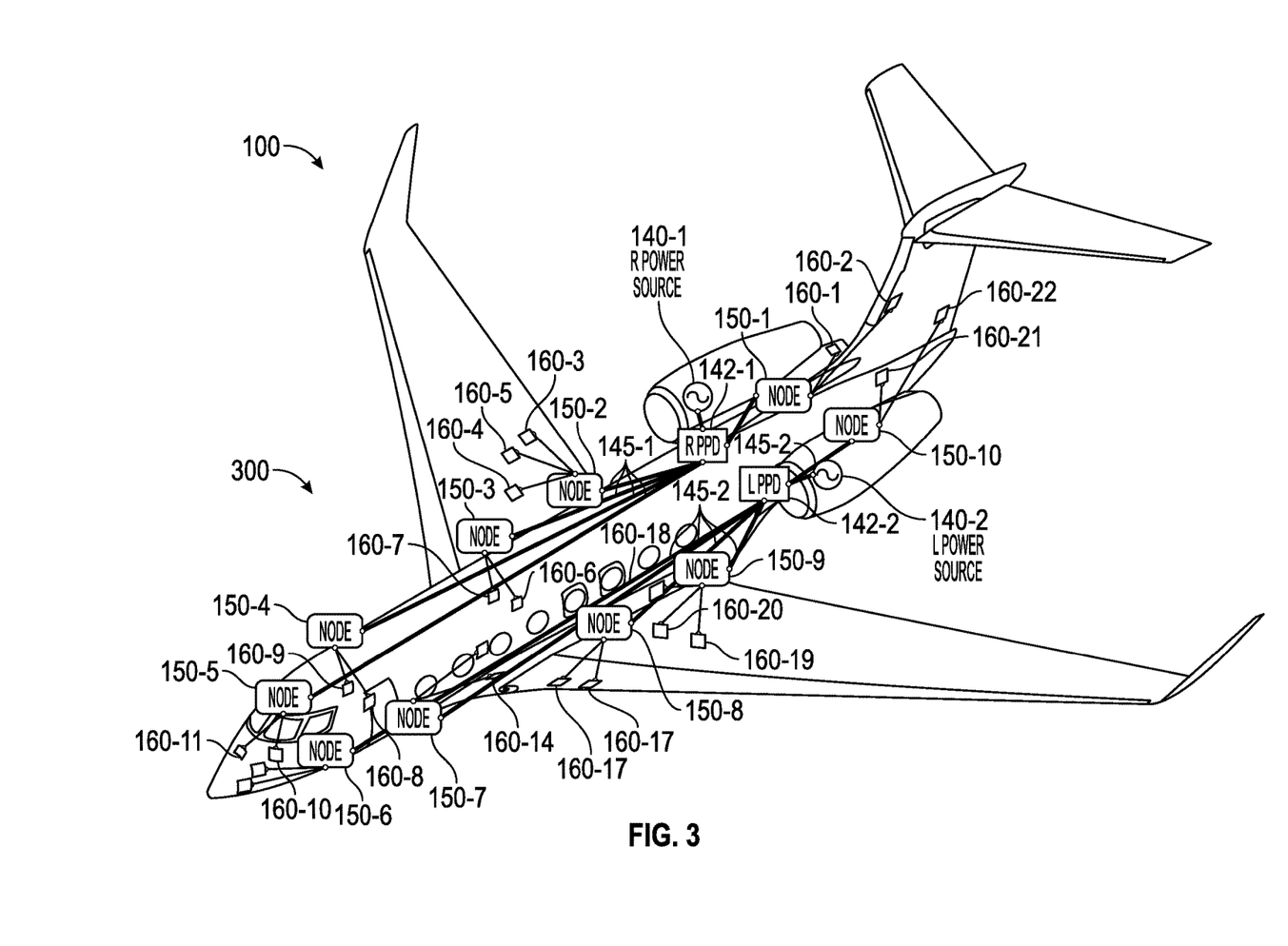
FIGS. 3 and 4 are diagrams that illustrate different aspects of one non-limiting implementation of a distributed aircraft systems platform that can be provided in an aircraft using nodes to create an integrated power distribution, data network, and control architecture in accordance with the disclosed embodiments.
Figure 4:
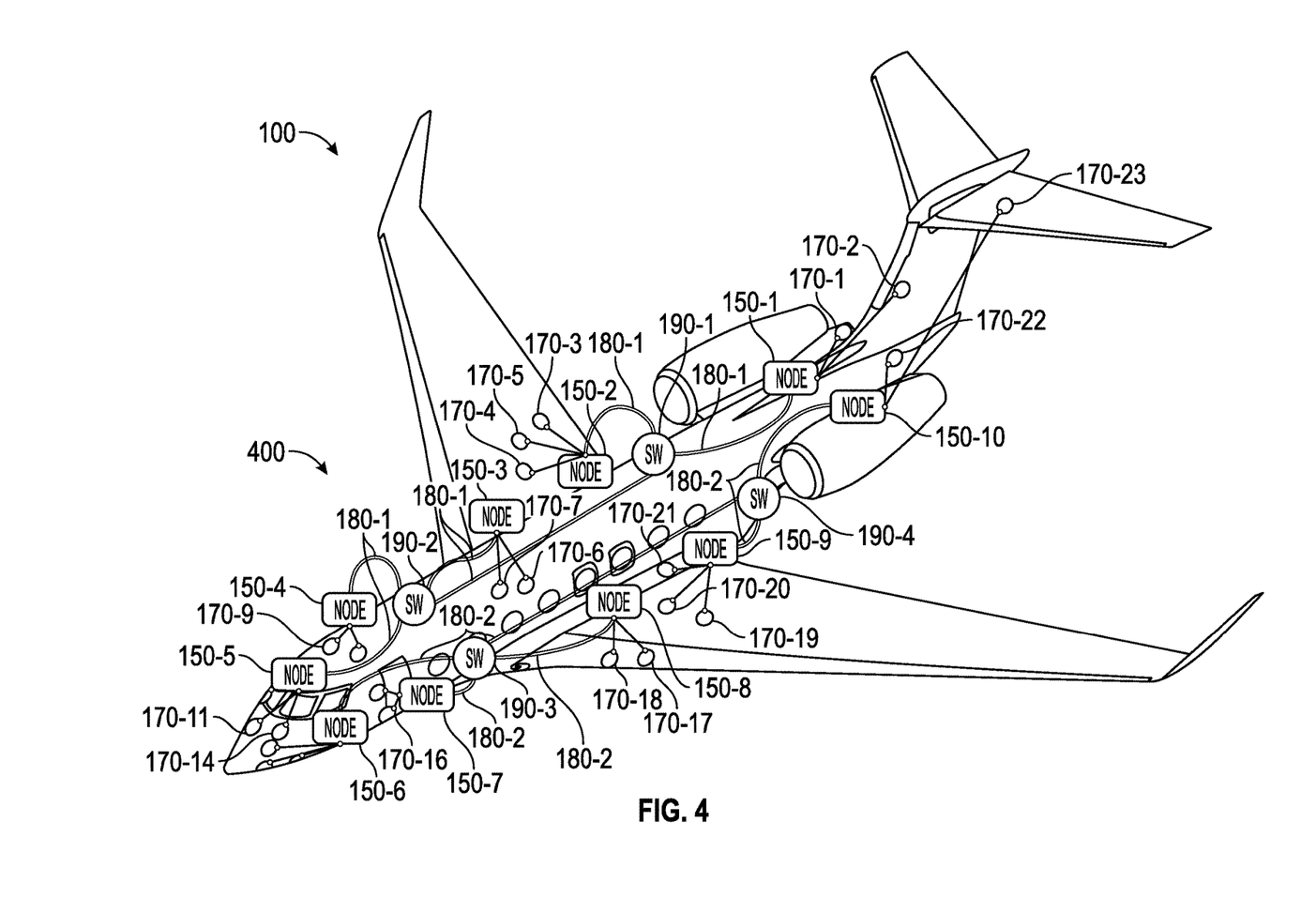

FIGS. 3 and 4 are diagrams that illustrate different aspects of an integrated power distribution, data network, and control architecture that can be used in an aircraft 100 to provide a distributed aircraft systems platform. FIGS. 3 and 4 are depictions of the same integrated system, but are illustrated in separate drawings that focus on different features provided via nodes 150 that are part of the integrated power distribution, data network, and control architecture. In particular, FIG. 3 is a diagram that illustrates the power distribution aspect of the distributed aircraft systems platform, whereas FIG. 4 is a diagram that illustrates the data network aspect of the distributed aircraft systems platform.

FIG. 3 is a simplified diagram of an aircraft power distribution network 300 in accordance with one implementation of the disclosed embodiments. As illustrated in FIG. 3, the aircraft 100 includes right-side primary power source (PPS) 140-1, a left-side primary power source (PPS) 140-2, a right-side primary power distribution (PPD) Unit 142-1, a left-side primary power distribution (PPD) Unit 142-2, and nodes 150 that are distributed throughout the aircraft.

In this embodiment, each PPS 140 is connected through a PPD unit 142 to a number of nodes 150 that are distributed throughout the aircraft. Each PPS can be any primary source of electrical power that is external to the nodes, and can vary depending on the implementation. For instance, in one embodiment, each PPS can be implemented using a constant frequency AC generator. In another embodiment, each PPS can be implemented using a variable frequency AC generator (e.g., generator coupled directly with the engine such that the frequency varies with engine speed). The PPD unit 142 connects a PPS to multiple secondary power distribution (SPD) units, including nodes 150, and may additionally include switching or power conversion capabilities. Therefore, in one embodiment, the electrical power output by the PPS can be relatively high-voltage AC electrical power that is transmitted directly to the nodes 150 and is converted to DC electrical power by the electrical power converter modules 230 in the nodes 150. In another embodiment, each PPD unit can include an AC-DC converter such that the AC electrical power output by the PPS can be converted to relatively high-voltage DC electrical power that is distributed to the nodes. Each node 150 is coupled to one of the PPD units 142 via a power distribution line 145 that carries electrical power to that node. In the non-limiting example shown in FIG. 1, the aircraft 100 includes five nodes 150-1 ... 150-5 on the right-side of the aircraft 100, and five nodes 150-6 ... 150-10 on the left-side of the aircraft 100. However, those skilled in the art will appreciate that this is only for purposes of illustrating one possible implementation and that the aircraft 100 can include any number of nodes 150 in any arrangement depending on the implementation.

Each node 150 is coupled to at least one electrical load 160. In FIG. 3, the electrical loads are represented by small rectangles and labeled with reference number 160. As used herein, an electrical load refers to any equipment on the aircraft that consumes electric power. Non-limiting examples of such equipment can include: motors, actuators, valves, lights, heaters, sensors, displays, cabin amenities, galley amenities, computers, processors, or any other device, component, or unit that consumes electrical power. In the non-limiting example shown in FIG. 3, the aircraft 100 includes eleven rectangles that represent electrical loads 160-1 ... 160-11 on the right-side of the aircraft 100, and eleven rectangles that represent electrical loads 160-12 ... 160-22 on the left-side of the aircraft 100. However, those skilled in the art will appreciate that this is only for purposes of illustrating one possible implementation and that the aircraft 100 can include one or more electrical loads 160 depending on the implementation. Depending on the implementation, the nodes 150 may be used to power all the electrical loads 160 on the aircraft (as illustrated in FIG. 3) or only part of them, with the remainder powered by traditional means.

FIG. 3 illustrates that each node 150 serves as a secondary power distribution (SPD) unit that distributes electrical power to at least one electrical load 160. Each node 150 is capable of converting electrical power received from a PPD unit 142 into a form that can be used by each of the individual electrical loads 160 that it is coupled to, and controlling distribution of electrical power to each of those individual electrical loads 160. For example, some electrical loads may consume direct current (DC) electrical power, whereas other electrical loads may consume alternating current (AC) electrical power. For instance, in one non-limiting implementation, some electrical loads can be designed to receive lower DC electrical power (e.g., 28 Volts), other electrical loads can be designed to receive higher DC electrical power (e.g., 270 Volts), while still other electrical loads can be designed to receive AC electrical power that has a low-voltage or a higher voltage (e.g., 115 volts). Moreover, for electrical loads designed to receive AC electrical power, the frequency can vary. For instance, some electrical loads may require AC electrical power having a frequency of 400 Hertz, while other electrical loads may require AC electrical power having a frequency of 60 Hertz.

As will be described below, the processor module 250 in each node 150 can host logic to perform a wide variety of functions. As an example of one function, the processor module 250 can monitor electrical characteristics (e.g., current, voltage, frequency) of the electrical power supplied to the one or more electrical loads and detect, based on the electrical characteristics, abnormal conditions. Examples of these abnormal conditions can include, for example, permanent or intermittent short circuit conditions, abnormal voltage conditions such as over voltage or under voltage, abnormal electric power quality (e.g., as determined by monitoring input or output waveform, frequency, phase, current, and/or voltage), and/or other fault conditions that reflect other undesirable or potentially unsafe conditions.

FIG. 4 is a simplified block diagram of an aircraft data network 400 that can be implemented using the nodes 150 in accordance with one non-limiting implementation of the disclosed embodiments. Similar to the FIG. 3 depiction of electrical loads, FIG. 4 illustrates that the aircraft can include a plurality of data elements 170 (represented by small circles located throughout the aircraft), data buses 180, and network switches 190. It is to be appreciated that the implementation illustrated in FIG. 4 is non-limiting that that any number of nodes 150, data elements 170, data busses 180 and network switches 190 can be included in other implementations. In the embodiment that is illustrated in FIG. 4, the network switches 190 are shown as distinct or dedicated devices that are separate from the nodes. In this embodiment, the network switches 190 effectively act as a centralized hub that is part of a star network topology. FIG. 4 represents one particular, non-limiting implementation in which switching functionality of the network switches 190 is implemented separately and externally from the nodes 150. It should be appreciated that the switching functionality of the network switches 190 can be implemented using the processor module 250 within each node in other embodiments. This allows the nodes to form other network topologies, for example a mesh, ring, or daisy chain network topology.

Data elements 170 can represent data sources and/or data consumers that are external to the nodes. Some data elements are sources of data, but do not consume data, some data elements are consumers of data, but are not sources of data, and some data elements are both data sources and data consumers. A data source is a transmitting system that transmits data, whereas a data consumer is a receiving system that receives data. Data sources and data consumers will be discussed in greater detail below.

In the particular embodiment illustrated in FIG. 4, each node 150 can be communicatively coupled to at least one network switch 190 via a data bus 180. Each network switch 190 can be communicatively coupled to nodes 150 and/or other network switches 190 via a data bus 180. The data bus 180 can be high bandwidth digital bus such as one that is compliant with ARINC-664. The term "network switch" can refer to a networking device that connects two or more aircraft systems (e.g., nodes or other devices) together and performs switching functions with respect to data communicated between those systems. A network switch receives incoming data, determines its destination, and forwards the processed data along a path towards its intended destination. As such, each network switch is configured to: read translated data, determine its destination and a path to that destination (e.g., a particular data element that is a consumer of that data), and route the translated data along a path towards the appropriate destination.

Each node 150 can receive incoming signals from any number of different data elements 170 that serve as data sources. In other words, each node 150 receives data from any data elements 170 that are data sources. The different incoming signals can be in a variety of forms (e.g., discrete, analog, digital). Each node can also receive incoming signals from other nodes via the data bus 180 and network switches 190, and can then distribute this data to any number of different data elements 170 that are data consumers. Thus, each node 150 is configured to serve as a data collection and distribution unit that is capable of receiving data from data elements 170 and communicating data to other data elements 170. In one implementation, each node 150 can "concentrate" the data received from data elements 170 that are data sources, and communicate or distribute the concentrated data over the data bus 180 to a network switch 190. The network switch 190 then routes data toward various destinations or end points. The network switch 190 then routes data to other nodes 150 that it is coupled to or to another network switch 190 that it is coupled to so that the data moves along an appropriate path to its destination or data elements 170 that are the intended data consumers of that data.

Because the data received from data elements 170 can have a variety of different forms (e.g., discrete, analog, digital), in one embodiment, each node 150 can convert input data from one form to another before outputting it. For instance, each node 150 can receive input data (in discrete, analog or digital form) from a variety of different data elements and can process and reformat the input data into one or more digital data formats so that it can be communicated over one or more networks. A node 150 may act as a protocol converter that can convert incoming input signals per an incoming network protocol (e.g.: EIA/TIA-232, EIA/TIA-422, EIA/TIA-485, ARINC 429, USB 2.0, ARINC-664, MIL-STD-1553, CAN bus, Ethernet) to a different protocol or protocols for retransmission. In addition, each node 150 can receive data per an incoming network protocol, and convert the data back into a variety of forms that is usable by the various data elements that are data consumers before communicating to those data elements (i.e., translate or reformat the network data into the data forms needed or used by each particular data consumer element connected to the node 150).

Data Elements

Data elements 170 that are data sources can include, for example, inertial reference systems (IRSs), attitude heading and reference systems (AHRSs), air data systems (ADSs), communication systems, Global Position System (GPS) receivers, Global Navigation Satellite System (GNSS) interfaces, other wireless interfaces, sensors, such as motion sensors, accelerometers, position sensors, pressure sensors, temperature sensors, gyroscopes, magnetic compasses, navigation instrument sensors, speed sensors, angular rate sensors, position, angle, displacement, distance, speed, or acceleration sensors (e.g., accelerometers, inclinometers, position sensors, position switches, rotary encoders, resolvers, rotary/linear variable differential transformers, tachometers, etc.), acoustic sensors (e.g., sound, microphone, seismometer, accelerometer, etc.), vibration sensors, cameras, radars, etc. The data provided from the data sources can be discrete data, analog data, or digital data.

Data elements 170 that are data consumers can include, for example, avionics systems, communications systems, navigation systems, surveillance systems, monitoring systems, control systems, control panels, aircraft flight-control systems, collision-avoidance systems, aircraft management systems, radar systems, displays (e.g., control display units, multifunction displays (MFDs), standby displays), warning systems, flight control computers that are used to control the aircraft's control surfaces (e.g., ailerons, elevators, rudder, spoilers, flaps), engine controllers, APU controllers, and any other destination receiving systems that receive data. The data provided to the data consumers can be discrete data, analog data, or digital data.

Hosted Logic Implemented at Node Processor Modules

The processor module 250 of each node 150 can host logic for performing a number of different functions that are traditionally performed by dedicated controllers, units and systems that are traditionally distributed throughout the vehicle.

When the vehicle is an aircraft, non-limiting examples of these functions performed by the processor can include: processing sensor data that would conventionally be hosted at one or more controllers of an air data system; processing logic for pressure control, temperature control, flow control, and overheat detection that would conventionally be hosted at one or more controllers of a bleed air system; processing logic for fire protection, detection and suppression that would conventionally be hosted at one or more controllers of a fire protection system; processing logic for landing gear extension and retraction, landing gear position indication, and weight on wheels detection that would conventionally be hosted at a landing gear control unit of a landing gear system; processing logic for cabin environmental control (e.g., temperature, pressure, ventilation, humidity) that would conventionally be hosted at one or more controllers of an environmental control system (ECS); processing logic for cabin pressurization control that would conventionally be hosted at one or more controllers of a pressurization control system; processing logic for ice prevention or removal that would conventionally be hosted at one or more controllers of an ice protection system; processing logic for engine control and indication that would conventionally be hosted at one or more controllers of an engine system; processing logic for auxiliary power unit control and indication that would conventionally be hosted at one or more controllers of an auxiliary power unit system; processing logic for nose wheel steering that would conventionally be hosted at one or more controllers of a nose wheel steering system; processing logic for fuel quantity and temperature indication that would conventionally be hosted at one or more controllers of a fuel quantity indication system; processing logic for fuel storage and distribution control that would conventionally be hosted at one or more controllers of a fuel distribution system; processing logic for vehicle trajectory control, automatic vehicle trajectory control or guidance, automatic vehicle speed control or guidance, and logic for controlling primary or secondary flight control surfaces that would conventionally be hosted at one or more controllers of a flight control system; processing logic for flap and slat control that would conventionally be hosted at one or more controllers of a high lift device system; processing logic for navigation data collection and transmission that would conventionally be hosted at one or more controllers of a navigation system; processing logic for voice or data communication, and communication data collection and transmission that would conventionally be hosted at one or more controllers of a communication system; processing logic for display and warning that would conventionally be hosted at one or more controllers of a flight deck display system; processing logic for lighting control that would conventionally be hosted at one or more controllers of an internal or external lighting system; processing logic for data recording that would conventionally be hosted at one or more controllers of a recording system; processing logic for door control and position indication that would conventionally be hosted at one or more controllers of a doors system; processing logic for supplemental oxygen storage, distribution, and quantity indication that would conventionally be hosted at one or more controllers of an oxygen system; processing logic for water storage, water distribution, waste removal, and waste storage that would conventionally be hosted at one or more controllers of a water and waste system; processing logic for electrical power generation and distribution that would conventionally be hosted at one or more controllers of an electrical power system; processing logic for galleys, lavatories, entertainment systems, powered seats, powered internal cabin doors, and other cabin services that would conventionally be hosted at one or more controllers of a cabin management system; processing logic for hydraulic power generation, distribution, and monitoring that would conventionally be hosted at one or more controllers of a hydraulic system; processing logic for tire pressure and temperature monitoring that would conventionally be hosted at one or more controllers of tire pressure monitoring system; processing logic for brake control that would conventionally be hosted at one or more controllers of a brake control system; or processing other logic that is conventionally implemented at any other controller or processor onboard an aircraft.

Redundancy

For safety reasons, an aircraft is usually designed to include two or more redundant versions of each critical system component. This includes redundant power distribution systems, redundant data transmitting systems, redundant versions of the primary data network that is used to couple each of the redundant transmitting system to corresponding receiving systems, and redundant receiving systems.

In FIG. 4, due to space constraints, one non-limiting implementation of data networks is illustrated. In this implementation, nodes 150-1 through 150-5, data bus 180-1 and switches 190-1, 190-2 are equipment that make up a first data network that is located the left-side of the aircraft 100, whereas nodes 150-6 through 150-10, data bus 180-2 and switches 190-3, 190-4 are equipment that make up a second data network that is located on the right-side of the aircraft 100. Depending on the implementation, there may be one, two, or more data networks, which can be identical, similar or completely different from each other.

In one implementation, two or more data networks may perform different functions from each other. In such an implementation, the data networks are simply distinct data networks used for different purposes.

In another implementation, two or more data networks may be identical to each other to provide a measure of redundancy in the event that one of the data networks (or a component thereof) experiences a fault. For instance, if one of the nodes 150-1 through 150-5, or part of the data bus 180-1 or one of the switches 190-1, 190-2 that make up the first data network the left-side of the aircraft 100 experience a fault condition, but the second data network does not, then the second data network could still be utilized to accomplish the same or equivalent functionality as the first data network. However, in this case a situation could arise where all of the nodes 150 or all of the switches 190 experienced a common mode of fault (e.g., an unforeseen software glitch or common hardware fault).

Thus, in yet another implementation, two or more data networks can be functionally similar to each other, providing redundancy, but can be implemented using different hardware and/or software so that the data networks can transport data over independent paths that are not susceptible to common modes of fault. To explain further, in order to reduce the likelihood of common mode faults, one data network can include network switches, data buses and nodes that employ different hardware and/or software in comparison to the network switches, data buses and nodes that are implemented within another data network.

Moreover, in some implementations, even more complex data networks can provide additional redundancy. For instance, in one embodiment, each network on the aircraft 100 includes additional sets of nodes, additional data buses and additional switches so that redundant data paths are provided within the first data network and the second data network of the aircraft 100. For instance, in one implementation, a second separate data path may be provided within the first data network and within the second data network to provide separate, alternative pathways for data that is communicated between the various data elements on each network. This way there can be alternative communication paths (or multiple distinct pathways) for communicating data between the data elements (and any other systems that are a source of or that consume that data).

In addition, these alternate communication paths can be dissimilar meaning that each path can include different hardware and/or software components that are dissimilar but still perform similar functions in different ways. This dissimilarity helps ensure that the analogous components (e.g., nodes or network switches) in each path are not necessarily subject to the same fault modes or operational errors. Thus, by utilizing different hardware and/or software on each path, corresponding components are not subject to the same fault modes (e.g., software glitches or bugs, hardware failures, or software or hardware design errors not discovered in verification testing). This can help reduce and/or eliminate the risk of common mode faults. This way, for example, the aircraft's functions that rely on critical data will have at least two sources for that critical data, and each of the two sources will transport that critical data over different, dissimilar paths.

Persons skilled in the art will note that the same redundancy considerations described for the data networks also apply to the power distribution aspect of the nodes 150. It will also be noted that the non-limiting example architecture provided for the aircraft 100 provides redundancy of power and data, by using separate left and right sets of nodes 150. Other architectures are possible using different quantities and arrangements of nodes 150, providing less, similar, or superior redundancy as required by the particular application.

Conclusion

As described above, a plurality of nodes can be distributed throughout a vehicle, such as an aircraft, and used to create a single integrated systems platform capable of distributed data acquisition and transmission, both distributed and centralized control processing, and power distribution and control. For example, on aircraft the network of nodes can replace modular power tiles (MPTs), remote data concentrators (RDCs), dedicated system control units, modular avionics units (MAUs), and the current multiplicity of digital networks to simultaneously provide secondary power distribution, data networking, and system control with the level of redundancy appropriate to the application. Thus, in some implementations, the disclosed embodiments can allow for replacement of most or all system controllers, central computers, data concentration devices and networks and secondary power distribution systems with a single highly-redundant, scalable, and flexible distributed aircraft systems platform. As a result, system capabilities and resources can be more efficiently utilized, and significant reductions in weight and installation and maintenance complexity can be achieved.

In addition, the distributed aircraft systems platform improves systems integration by combining a distributed control and data network with power distribution and switching, and system control capability. Instead of having federated or integrated controllers signaling a separate power distribution system, the distributed systems platform integrates both these roles, eliminating unnecessary wiring interconnection.

The distributed systems platform can also allow higher robustness to localized damage or failure, due to the increased ability to perform functions locally even when the remote processing and data sources may be unavailable. This is due to the fact that the distributed systems platform contains data input/output, power distribution and processing capability distributed throughout the aircraft.

Because wiring and other hardware components can be eliminated with this system architecture, it can significantly reduce system weight, particularly on larger vehicles, while improving safety, reliability, and survivability. The distributed systems platform can also reduce manufacturing and maintenance costs.

Those of skill in the art would further appreciate that the various illustrative logical blocks, modules, circuits, described in connection with the embodiments disclosed herein may be implemented as electronic hardware, computer software, or combinations of both. Some of the embodiments and implementations are described above in terms of functional and/or logical block components (or modules). However, it should be appreciated that such block components (or modules) may be realized by any number of hardware, software, and/or firmware components configured to perform the specified functions. To clearly illustrate this interchangeability of hardware and software, various illustrative components, blocks, modules, circuits, have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. For example, although the disclosed embodiments are described with reference to an aircraft, those skilled in the art will appreciate that the disclosed embodiments could be implemented in other types of vehicles including, but not limited to, spacecraft, submarines, surface ships, automobiles, trains, motorcycles, etc. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. An integrated multi-function node, comprising:
    a housing; and
    a plurality of components that are contained within and enclosed by the housing to form a single integrated unit, wherein the plurality of components are interconnected with connections that are internal to the housing, the plurality of components comprising:
        power distribution (PD) components that are configured to receive electrical power from at least one source external to the integrated multi-function node and that are configured to distribute and control the electrical power to a plurality of active and passive electrical loads that are external to the integrated multi-function node, the PD components comprising:
            an electrical power input interface configured to receive an electrical power input from the at least one source external to the integrated multi-function node; and
            one or more power control modules, wherein each power control module is configured to control the electrical power supplied to one or more electrical power output interfaces, wherein the one or more electrical power output interfaces are configured to supply power to the plurality of active and passive electrical loads; and
        data collection and distribution (DCD) components that are configured to receive data from data sources external to the integrated multi-function node and to transmit data to data consumers external to the integrated multi-function node.

2. An integrated multi-function node according to claim 1, wherein the DCD components are configured to receive command signals that are generated externally to the integrated multi-function node, and wherein each power control module is configured to control the supply of electrical power to the active and passive electrical loads in response to the command signals.

3. An integrated multi-function node according to claim 1, wherein the PD components further comprise:
    an electrical power converter module configured to receive the electrical power input via the electrical power input interface and convert characteristics of the received electrical power to generate an electrical power output that is provided to one or more power control modules.

4. An integrated multi-function node according to claim 1, wherein the PD components and DCD components are respectively configured to receive electrical power input and to receive or transmit data over a common interface, such that one or more common wires carries electrical power to the integrated multi-function node and carries data to or from the integrated multi-function node, wherein the electrical power input interface is physically connectable to the at least one source external to the integrated multi-function node, and wherein the one or more electrical power output interfaces are each physically connectable to one or more of the plurality of active and passive electrical loads.

5. An integrated multi-function node according to claim 1, further comprising:
    a processor module; and
    a non-transitory computer-readable medium having computer-executable instructions stored thereon that, when executed by the processor module, cause the processor module to:
        command the one or more power control modules that supply electrical power to the one or more electrical loads external to the integrated multi-function node; and
        process data received by the DCD components and process data to be transmitted by the DCD components.

6. An integrated multi-function node according to claim 5, wherein the processor module is configured to:
    receive data from data sources external to the integrated multi-function node via the DCD components; and
    wherein the non-transitory computer-readable medium has computer-executable instructions stored thereon that, when executed by the processor module, cause the processor module to: transmit commands to one or more power control modules that supply the electrical power to the one or more electrical loads such that power is supplied to or removed from the electrical loads in response to the data received via the DCD components as defined by the stored computer-executable instructions.

7. An integrated multi-function node according to claim 6, wherein the non-transitory computer-readable medium has computer-executable instructions stored thereon that, when executed by the processor module, cause the processor module to:
    transmit signals to data consumers external to the integrated multi-function node via the DCD components such that the signals transmitted to data consumers external to the integrated multi-function node are responsive to the data received via the DCD components as defined by the stored computer-executable instructions.

8. An integrated multi-function node according to claim 6, wherein the non-transitory computer-readable medium has computer-executable instructions stored thereon that, when executed by the processor module, cause the processor module to:
    detect when the integrated multi-function node is connected to different combinations of power sources, data sources, data consumers, and electrical loads, allowing the integrated multi-function node to provide different commands to the power control modules in response to data received via the DCD components depending on which combination of power sources, data sources, data consumers, and electrical loads the integrated multi-function node is connected to.

9. A vehicle, comprising:
at least one electrical power source;
an integrated power distribution, data network, and control architecture comprising:
    a plurality of active and passive electrical loads located throughout the vehicle;
    a plurality of data elements distributed throughout the vehicle, wherein each data element is either a data source, a data consumer, or both a data source and a data consumer;
    a plurality of integrated multi-function nodes, wherein each integrated multi-function node comprises:
        a housing;
        a plurality of components that are contained within and enclosed by the housing to form a single integrated unit that is installed in and removeable from the vehicle, wherein the plurality of components are interconnected with connections that are internal to the housing, the plurality of components comprising:
            power distribution (PD) components that are configured to receive electrical power from the at least one electrical power source that is external to the integrated multi-function node, wherein the PD components are configured to distribute and control the electrical power to the plurality of active and passive electrical loads that are external to the integrated multi-function node, the PD components comprising:
                an electrical power input interface configured to receive an electrical power input from the at least one source external to the integrated multi-function node; and
                one or more power control modules, wherein each power control module is configured to control the electrical power supplied to one or more electrical power output interfaces, wherein the one or more electrical power output interfaces are configured to supply power to the plurality of active and passive electrical loads; and
            data collection and distribution (DCD) components that are configured to receive data from data sources external to the integrated multi-function node and to transmit data to data consumers external to the integrated multi-function node; and
            a processor module; and
            a non-transitory computer-readable medium having computer-executable instructions stored thereon that, when executed by the processor module, cause the processor module to:
                command the one or more power control modules that supply electrical power to the active and passive electrical loads external to the integrated multi-function node;
                process data received by the DCD components;
                process data to be transmitted by the DCD components; and
                receive data from data sources external to the integrated multi-function node via the DCD components; and
                wherein the non-transitory computer-readable medium has computer-executable instructions stored thereon that, when executed by the processor module, cause the processor module to transmit commands to one or more power control modules that supply the electrical power to the active and passive electrical loads such that power is supplied to or removed from the active and passive electrical loads in a way that is responsive to the data received via the DCD components as defined by the stored computer-executable instructions; and
    wherein the integrated power distribution, data network, and control architecture is configured to:
        receive commands from control devices operated by the vehicle operator via the DCD components of the integrated multi-function nodes; and
        receive data about the state of the vehicle from data sources via the DCD components of the integrated multi-function nodes; and
        control power supplied to the plurality of active and passive electrical loads in response to the operator commands and the state of the vehicle as defined by the computer-executable instructions stored in the integrated multi-function nodes.

10. A vehicle according to claim 9, wherein operation of the plurality of active and passive electrical loads, in response to operator commands and the state of the vehicle as defined by the computer-executable instructions stored in the integrated multi-function nodes, result in one or more functions being performed, the functions comprising:
    sensor data processing and distribution; hydraulic power generation or distribution control; electrical power generation or distribution control; fuel storage or distribution control, or quantity indication; vehicle trajectory control; automatic vehicle trajectory control or guidance; automatic vehicle speed control or guidance; vehicle acceleration or deceleration control; display or warning control; data recording; navigation data processing; voice or data communication data processing; fire protection or suppression control; environmental control; ice prevention or removal control; lighting control; supplemental oxygen storage or distribution control; water storage or supply control; waste removal or storage control; auxiliary power unit control; door operation control or position sensing; engine or motor control.

11. A vehicle, comprising:
  at least one electrical power source;
  an integrated power distribution, data network, and control architecture comprising:
    a plurality of active and passive electrical loads located throughout the vehicle;
    a plurality of data elements distributed throughout the vehicle, wherein each data element is either a data source, a data consumer, or both a data source and a data consumer;
    a plurality of integrated multi-function nodes, wherein each integrated multi-function node comprises:
      a housing; and
      a plurality of components that are contained within and enclosed by the housing to form a single integrated unit that is installed in and removeable from the vehicle, wherein the plurality of components are interconnected with connections that are internal to the housing, the plurality of components comprising:
        power distribution (PD) components that are configured to receive electrical power from the at least one electrical power source that is external to the integrated multi-function node, wherein the PD components are configured to distribute and control the electrical power to the plurality of active and passive electrical loads that are external to the integrated multi-function node, the PD components comprising:
          an electrical power input interface configured to receive an electrical power input from the at least one source external to the integrated multi-function node; and
          one or more power control modules, wherein each power control module is configured to control the electrical power supplied to one or more electrical power output interfaces, wherein the one or more electrical power output interfaces are configured to supply power to the plurality of active and passive electrical loads external to the integrated multi-function node; and
        data collection and distribution (DCD) components that are configured to receive data from data sources external to the integrated multi-function node and to transmit data to data consumers external to the integrated multi-function node.

12. A vehicle according to claim 11, wherein each node further comprises:
  a processor module; and
  a non-transitory computer-readable medium having computer-executable instructions stored thereon that, when executed by the processor module, cause the processor module to:
    process data received by the DCD components; process data to be transmitted by the DCD components; and receive data from data sources external to the integrated multi-function node via the DCD components.

13. A vehicle according to claim 12, wherein the computer-executable instructions, when executed by the processor module, further cause the processor module to: command the one or more power control modules that supply electrical power to the active and passive electrical loads external to the integrated multi-function node.

14. A vehicle according to claim 13, wherein the computer-executable instructions, when executed by the processor module, further cause the processor module to:
  transmit commands to one or more power control modules that supply the electrical power to the active and passive electrical loads such that power is supplied to or removed from the active and passive electrical loads in a way that is responsive to the data received via the DCD components as defined by the stored computer-executable instructions.

15. A vehicle according to claim 11, wherein the integrated power distribution, data network, and control architecture is configured to:
  receive commands from control devices operated by a vehicle operator via the DCD components of the integrated multi-function nodes; and
  receive data about the state of the vehicle from data sources via the DCD components of the integrated multi-function nodes; and
  control power supplied to the plurality of active and passive electrical loads in response to the operator commands and the state of the vehicle as defined by the computer-executable instructions stored in the integrated multi-function nodes.

16. A vehicle according to claim 11, wherein operation of the plurality of active and passive electrical loads, in response to operator commands and the state of the vehicle as defined by the computer-executable instructions stored in the integrated multi-function nodes, result in one or more functions being performed.

17. A vehicle according to claim 16, wherein the one or more functions comprise:
  sensor data processing and distribution;
  hydraulic power generation or distribution control;
  electrical power generation or distribution control; and
  fuel storage or distribution control, or quantity indication.

18. A vehicle according to claim 16, wherein the one or more functions comprise:
  vehicle trajectory control;
  automatic vehicle trajectory control or guidance;
  automatic vehicle speed control or guidance;
  vehicle acceleration or deceleration control; and
  engine or motor control.

19. A vehicle according to claim 16, wherein the one or more functions comprise:
  display or warning control;
  data recording;
  navigation data processing; and
  voice or data communication data processing.

20. A vehicle according to claim 16, wherein the one or more functions comprise:
  fire protection or suppression control;
  environmental control;
  ice prevention or removal control;
  lighting control;
  supplemental oxygen storage or distribution control;
  water storage or supply control;
  waste removal or storage control; and
  door operation control or position sensing.

* * * * *